(12) United States Patent
Barlow

(10) Patent No.: US 11,414,224 B1
(45) Date of Patent: Aug. 16, 2022

(54) UTENSIL COVER SYSTEM

(71) Applicant: David George Barlow, Jackson, WY (US)

(72) Inventor: David George Barlow, Jackson, WY (US)

(*) Notice: Subject to any disclaimer, the term of this patent is extended or adjusted under 35 U.S.C. 154(b) by 237 days.

(21) Appl. No.: 16/278,618

(22) Filed: Feb. 18, 2019

Related U.S. Application Data

(60) Provisional application No. 62/710,377, filed on Feb. 16, 2018.

(51) Int. Cl.
| | | |
|---|---|---|
| *B65B 11/02* | (2006.01) | |
| *A47F 10/06* | (2006.01) | |
| *B65B 57/12* | (2006.01) | |
| *B65B 5/04* | (2006.01) | |
| *A47F 10/02* | (2006.01) | |

(52) U.S. Cl.
CPC .......... *B65B 11/025* (2013.01); *A47F 10/02* (2013.01); *A47F 10/06* (2013.01); *B65B 5/04* (2013.01); *B65B 57/12* (2013.01)

(58) Field of Classification Search
CPC ......... B65B 11/025; B65B 5/04; B65B 57/12; A47F 10/02; A47F 10/06; A47J 47/16; A47J 47/00; A47J 47/01
USPC ........................................................ 53/459
See application file for complete search history.

(56) References Cited

U.S. PATENT DOCUMENTS

| | | | | |
|---|---|---|---|---|
| 1,220,559 A | * | 3/1917 | Riebe ................. | A47G 21/14 206/553 |
| 2,788,827 A | * | 4/1957 | Banner ................ | A47G 21/14 206/553 |
| 4,930,637 A | | 6/1990 | DeRoseau et al. | |
| 5,011,017 A | | 4/1991 | Giesen | |
| 5,188,235 A | | 2/1993 | Pierce et al. | |
| 5,244,025 A | * | 9/1993 | Wewers ............... | A45C 11/00 150/154 |
| 5,335,788 A | * | 8/1994 | Beasley .............. | B65D 33/001 206/554 |
| 5,562,580 A | * | 10/1996 | Beasley .............. | B65D 33/001 493/194 |
| 5,845,779 A | * | 12/1998 | Wilfong, Jr ......... | B65D 33/001 206/554 |
| 5,881,882 A | | 3/1999 | Fletcher et al. | |
| 6,719,140 B1 | | 4/2004 | Rinsler | |
| 9,156,580 B2 | * | 10/2015 | Ladanyi ............... | A47G 21/14 |
| 9,434,590 B2 | * | 9/2016 | Miksovsky .......... | B67B 7/44 |
| 10,220,997 B2 | * | 3/2019 | Oakes .................. | B65D 75/42 |
| 10,308,426 B2 | * | 6/2019 | Castro ................. | B65B 67/1205 |
| 2003/0064189 A1 | | 4/2003 | Berg et al. | |
| 2004/0045860 A1 | * | 3/2004 | Edgerly ............... | B65D 33/008 206/504 |

(Continued)

FOREIGN PATENT DOCUMENTS

| | | |
|---|---|---|
| GB | 2315255 A | 11/1999 |
| JP | 2007030968 A | 2/2007 |

*Primary Examiner* — Chelsea E Stinson
*Assistant Examiner* — Scott A Howell
(74) *Attorney, Agent, or Firm* — Avek IP, LLC

(57) ABSTRACT

A utensil cover system includes a frame; and a first utensil cover. The first utensil cover has a first receptacle for receiving an end portion of a utensil; and a first tab extending from the first receptacle. The first tab and the first receptacle are separated by a line of weakness, and the utensil cover is temporarily attached to the frame via a connection member.

11 Claims, 6 Drawing Sheets

(56) References Cited

U.S. PATENT DOCUMENTS

| | | |
|---|---|---|
| 2007/0095717 A1 | 5/2007 | Tucker |
| 2008/0264532 A1 | 10/2008 | Wilson |
| 2009/0014345 A1 | 1/2009 | Caines |
| 2010/0307955 A1 | 12/2010 | McMillan |
| 2013/0270330 A1 | 10/2013 | Godley |
| 2014/0027331 A1* | 1/2014 | Ladayni ............... B65D 5/5213 206/373 |
| 2014/0339127 A1 | 11/2014 | Dao et al. |
| 2015/0028046 A1* | 1/2015 | Oakes .................... B65D 75/42 221/1 |
| 2020/0345183 A1* | 11/2020 | Boyd ...................... A47J 47/16 |

* cited by examiner

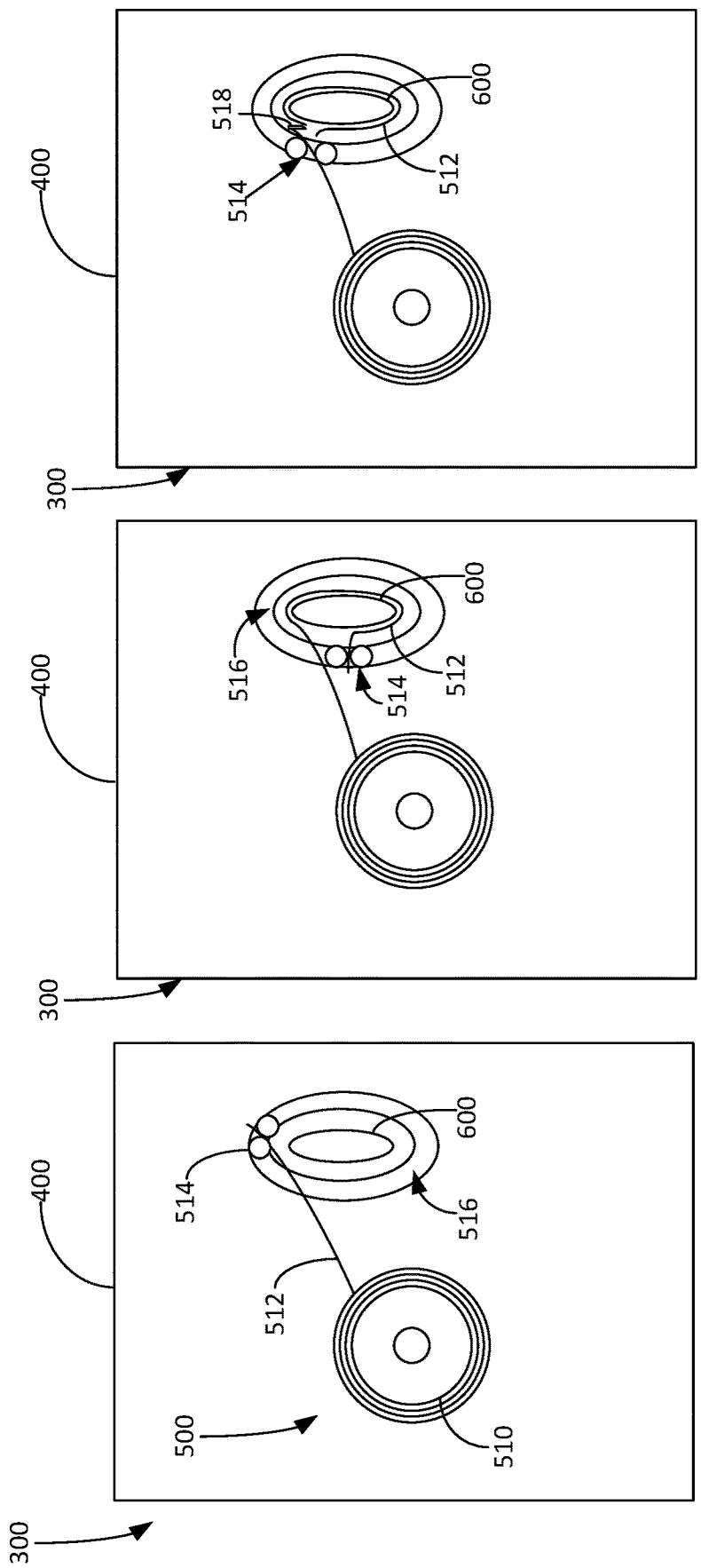

UTENSIL COVER SYSTEM

CROSS REFERENCE TO RELATED APPLICATIONS

This application claims priority to U.S. Provisional Patent Application No. 62/710,377, filed Feb. 16, 2018, the disclosure of which is incorporated herein by reference in its entirety.

BACKGROUND

Maintaining a sanitary environment in areas where food is present is a constant concern and struggle. This is especially true where there is little regulation over the area where the food is present. For example, convenience stores (e.g., gas stations, grocery stores, etc.) often have areas in which a customer may select a prepared food item for consumption, which requires that the customer either insert his or her hands into the area in which the food is held, or to make use of a utensil that is provided to aid in grabbing the food. However, there is little, if any, regulation of how a customer handles the utensil, including where the utensil is placed after it is used. For example, a user cannot be sure that a previous customer did not drop the utensil on the floor before putting it back for later use by another. Therefore, while perhaps better than using uncovered hands, the utensil may actually provide little relief from germs.

Further, certain persons may have allergies which require that they stay away from particular foods or food components. For example, some individuals may have allergies to red dye, which may be present in food. If the allergy is extreme, even coming into contact with the red dye may cause an allergic reaction. A utensil may not be sanitized between uses, and therefore, may come into contact with foods that may spread the allergen to the allergic customer.

Utensil covers have previously been developed for use with various utensils. These covers, however, tend to require that a user place them onto, or remove them from, the utensil using their hands, which does not further the purpose of preventing the spread of germs. Other utensil cover designs are not meant for utensils in use, but rather are meant to protect a utensil prior to its use. A utensil covering system which provides easy covering of the utensil (and removal of the cover) without requiring user contact would be beneficial.

SUMMARY

The following presents a simplified summary of the invention in order to provide a basic understanding of some aspects of the invention. This summary is not an extensive overview of the invention. It is not intended to identify the critical elements of the invention or to delineate the scope of the invention. Its sole purpose is to present some concepts of the invention in a simplified form as a prelude to the more detailed description that is presented herein.

In one embodiment, a utensil cover system includes a frame; and a first utensil cover. The first utensil cover has a first receptacle for receiving an end portion of a utensil; and a first tab extending from the first receptacle. The first tab and the first receptacle are separated by a line of weakness, and the utensil cover is temporarily attached to the frame via a connection member.

In another embodiment, a method of covering a utensil comprises providing a first utensil; providing a utensil cover system; inserting an end of the utensil into utensil cover system; and pulling the utensil away from the frame with the first utensil cover. The utensil cover system includes a frame; a first utensil cover; and a second utensil cover. The first utensil cover includes a first receptacle for receiving an end portion of the first utensil; and a first tab extending from the first receptacle. The second utensil cover is positioned behind the first utensil cover, and includes a second receptacle for receiving an end portion of a second utensil; and a second tab extending from the second receptacle. The first and second utensil covers are temporarily attached to the frame via a connection member through the respective tabs; and the first utensil cover is releasably attached to the second utensil cover. Pulling the utensil away from the frame opens the second utensil cover for receiving the second utensil; and releases the first utensil cover from the second utensil cover.

In still another embodiment, a utensil cover system comprises a wrapping module. The wrapping module includes a rotating mechanism comprising a film; a clamping device for clamping a free end of the film; and a circular track, the clamping device being disposed in the track and operable to move around the track. A utensil is inserted into a central area of the track; and movement of the clamping device around the track causes the film to wrap around an end portion of the utensil.

BRIEF DESCRIPTION OF THE DRAWINGS

Illustrative embodiments of the disclosure are described in detail below with reference to the attached drawing figures.

FIGS. 7A-C are front views of an inside of a housing having a utensil cover system according to still yet another embodiment of the invention.

WRITTEN DESCRIPTION

Figure 1:
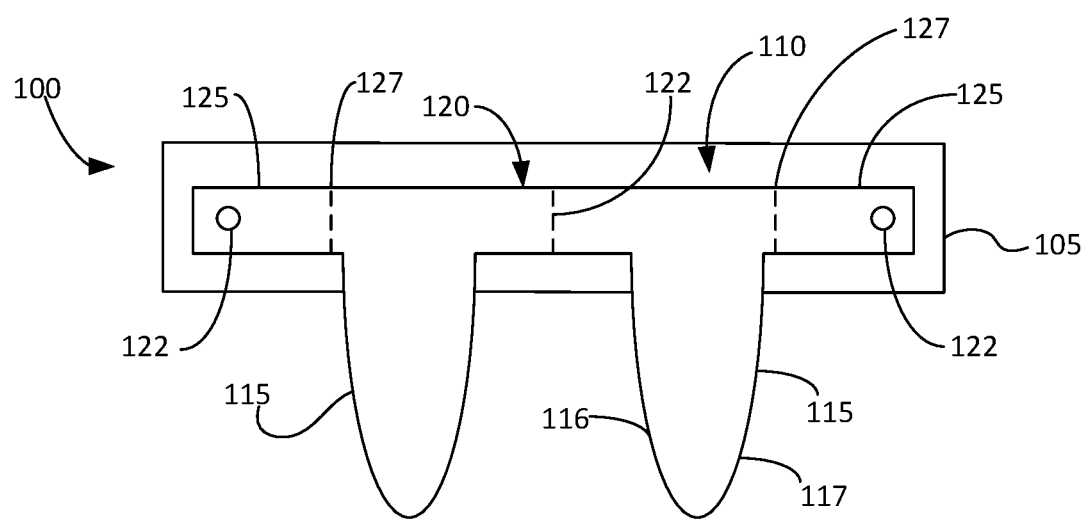
FIG. 1 is a front view of a utensil cover system according to an embodiment of the invention.
Figure 2:
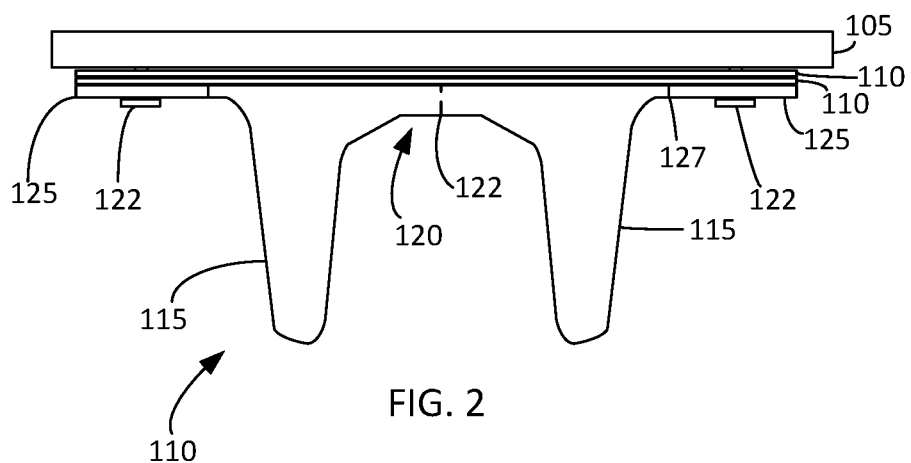
FIG. 2 is a top view of the utensil cover system of claim 1.

Embodiments of utensil cover systems are disclosed herein. Referring first to FIGS. 1-2, a utensil cover system 100 includes a frame 105 and a utensil cover 110 having at least one receptacle 115 for receiving a portion of a utensil. In FIG. 1, the utensil cover 110 is configured for use with a tong (or other two-legged utensil), and therefore has two receptacles 115, one for each leg of the tong. The receptacles 115 (where multiple receptacles are desired) may be connected, e.g., by a connection member 120. The connection member 120 may be configured to allow the tongs to open completely (or at least sufficiently wide enough to enable use of the tongs). Alternately, the receptacles 115 may stand alone (i.e., without a connection member 120). In embodiments, the connection member 120 may include an area of weakness 122, such as a perforation, to allow the receptacles 115 to be split apart for use of the utensil.

Tabs 125 extend outwardly from the utensil cover 110 to allow the cover 110 to connect to the frame 105. The utensil cover 110 is detachably secured to the frame 105 with fasteners 123 (e.g., pins, nails, screws, hooks, rivets, etc.). Optionally, the tabs 125 include openings for receiving the fasteners 122. In other embodiments, the fasteners 122 are simply inserted through the tabs 125 without a need for such an opening. The fasteners 122 maintain the cover 110 in connection with the frame 105 until removed by a user. The tabs 125 may additionally include areas of weakness 127 to allow the receptacles 115 to split apart from the tabs 125, while the tabs 125 remain in contact with the frame 105. However, it may be preferable for the tabs 125 to be maintained with the remainder of the cover 110 when the cover 110 is removed from the frame 105 to allow the user to remove the cover 110 from the utensil without touching the cover 110 or the utensil.

Preferably, the receptacles 115 are configured to snugly receive the respective end portion of each leg of the utensil such that the cover 110 does not easily fall off. However, the receptacles 115 must be able to fit over the utensil without requiring the user to use his or her hands to aid in the process. Accordingly, the utensil cover 110, and specifically, the receptacles 115, may be manufactured from an elastic material that can stretch over the utensil but maintain a snug fit therewith.

In another embodiment, the use of static electricity may help the receptacles 115 stay on the utensil. The utensil may be charged (e.g., in a uniquely configured holding vessel) prior to introducing the utensil to the utensil cover 110. With the utensil having a slight charge, the utensil may be inserted into the utensil cover 110, and the utensil cover 110 may cling to the utensil. The utensil cover 110 may remain clung to the utensil until it is removed by the user.

In use, at least a portion of a utensil may be inserted into the receptacle(s) 115. For example, continuing with the tong example, the ends of the tongs may be inserted into respective receptacles 115. Once the ends of the tongs are in the respective receptacles 115, the user may pull the tongs with the covers away from the frame 105.

To remove the cover 110 from the utensil, the user may grab the tabs 125 and pull the cover 110 from the utensil. Where the tabs 125 are separated from the remainder of the cover 110 (e.g., at the lines of weakness 127) the cover 110 may be removed by other means. For example, the user may discharge the utensil (e.g., by placing the utensil into a discharge vessel), which discharges the static charge between the utensil and the cover 110, causing the cover 110 to fall from the utensil. The cover 110 may remain in the discharge vessel for disposal. In another embodiment, the utensil with the cover 110 may be inserted into a disposal vessel. The disposal vessel may be equipped with means for removing the cover from the utensil (e.g., brushes, flexible flaps, etc. configured to allow the user to insert the utensil into the disposal vessel and remove the cover 110 when the utensil is removed from the vessel, etc.).

Further, in embodiments, the covers 110 may consist of multiple strengths of seals to aid in the removal of the utensil cover from the utensil. For example, as shown in FIG. 1, the inner-most seals 116 may be stronger than the outer-most seals 117 (or vice versa). The weaker outer-most seals 117 are configured such that, when a user is finished with the utensil, the user can easily pull the cover 110 away from the utensil, where the cover 110 breaks at the weak seals 117 and can be removed from the utensil. It shall be understood, however, that the strengths of the various seals along the perimeter of the covers may be customized based on the requirements of the particular uses, utensils, etc.

In still another embodiment, a hook is provided to hold a used cover 110. Once a user has completed the activity with the utensil, the user may orient the utensil such that the connection member 120 engages with the hook, thus removing the cover 110 from the utensil. In this manner, the user is not required to touch the ends of the utensil in order to remove the cover 110 therefrom.

A plurality of utensil covers 110 may be provided together in a bundle. The utensil covers 110 may be temporarily sealed together, e.g., at the tabs 125, at the connection members 120, along a top edge of the covers 110, etc. The seal may be strong enough to hold the covers 110 together, yet weak enough that the seal may be easily broken in order to tear away one cover 110 from the remaining covers 110 in the bundle. In use, removal of a first utensil holder 110 from the bundle causes a second utensil holder 110 to open up to receive the utensil.

Figure 3:
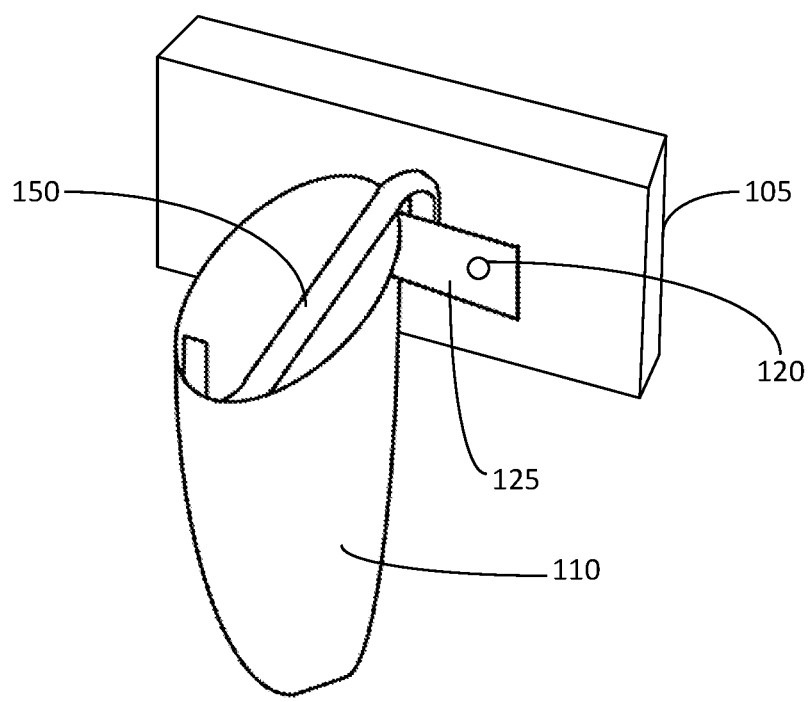
FIG. 3 is a perspective view of a utensil cover system according to another embodiment of the invention.

In one embodiment, such as illustrated in FIG. 3, a propping mechanism 150 aids in holding open the utensil cover 110. As the user pulls a first utensil cover 110 off of the frame 105 as a result of engagement with a utensil, a second utensil cover 110 is opened and engages with the propping mechanism 150 to hold open the second cover 110. Here, the cover may be formed of a strong elastic material, such as latex, which may stretch over the propping mechanism 150 but shrinks back to an original shape over the utensil. In other words, the cover 110 is stretched over the propping mechanism 150, and the user inserts the utensil into the cover 110 to remove the cover from the frame 105. When the cover 110 is removed from the frame 105, the cover 110 shrinks back to its original shape, enveloping the end of the utensil. The propping mechanism 150 may be equipped with hooks, for example, which may optionally engage with holes in the utensil covers 110 (not shown). Alternately, the propping mechanism 150 may engage with an inner surface of the utensil cover receptacle to hold the receptacle open.

Figure 4:
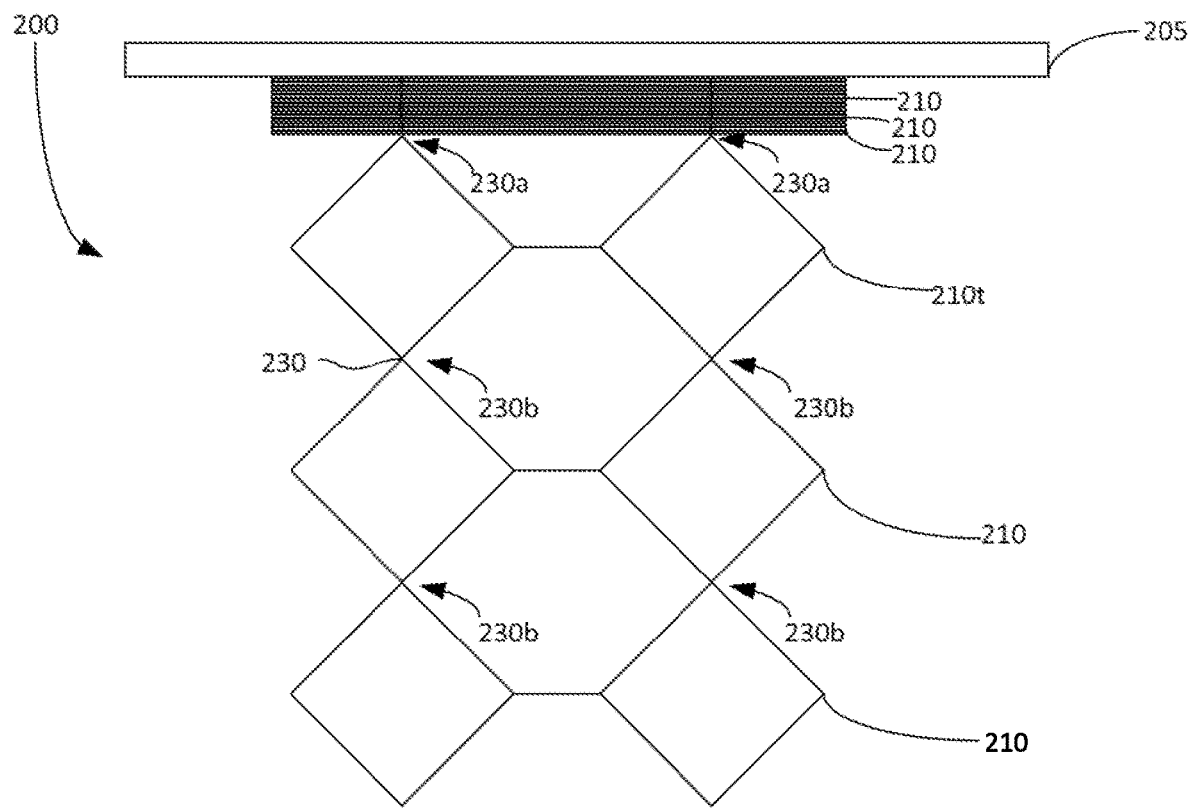
FIG. 4 is a front view of a utensil cover system according to still another embodiment of the invention.

FIG. 4 illustrates an alternative embodiment of a utensil cover system 200. Here, the covers 210 are horizontally mounted (e.g., using fasteners such as pins, nails, screws, hooks, adhesive, etc.) to a frame 205. Gravity helps to hold open the covers 210. In such a configuration, the covers 210 may not require the use of tabs or props. Instead, contact points 230 may allow multiple covers 210 to be loaded into/onto the frame 205. The contact points 230 may be areas where the respective covers 210 are sealed together, wherein the seals can be broken by pulling one cover 210 away from another. Each cover 210 may have multiple contact points 230 (e.g., a front contact point and a back contact point on each receptacle 215), and the contact points 230 may be sealed together so that only a desirable number (e.g., one, two, three, five, fifteen, etc.) covers are accessible at once. In an embodiment, some contact points 230a may form a stronger bond, while other contact points 230b form a weaker bond. Where the contact points 230b form a weaker bond, the respective covers 210 fixed via the weak contact points 230b extend from the frame 205, and are separable from each other by pulling the covers 210 apart at the contact points 230b. However, where the contact points 230a form a stronger bond, the covers 210 may be maintained closer to the frame 205 until the stronger bond 230a is released. When the stronger bond 230a is released, a predetermined number of covers 210 may extend from the frame 205.

For example, as shown in FIG. 4, it may be preferable for only three covers 210 to be accessible at a time. Between the three covers 210, weak contact points 230b maintain the covers 210 in contact until separated by a user. However, a strong contact point 230a between the top cover 210t and the covers 210 closer to the frame 205 ensures that only three covers 210 are accessible at a time. When the user pulls the top cover 210t away from the other covers 210, another three covers 210 will drop down and be accessible for use. This ensures that a sufficient number of covers 210 can be accessible without requiring the covers 210 to all extend from the frame 205 at once.

In use, the covers 210 may function similarly to the covers 110. A user may insert a utensil into the respective open utensil cover 210 and pull (e.g., with a downwards motion) to break the seal 230 a or 230b between two respective utensil covers 210. The force of breaking the seal 230a between two respective utensil covers 210 may be sufficient to cause a new set of utensil covers 210 to be opened up and prepared for use.

The utensil covers 110, 210 may be made of any appropriate material that can withstand the intended use for the utensil. For example, in embodiments, the covers 110, 210 may be paper, or a thin plastic, such as polyethylene, nylon, or polyester. In still other embodiments, as described herein, the covers 110, 210 may be latex, rubber, or polychloroprene due to their beneficial elastic properties.

Figure 5:
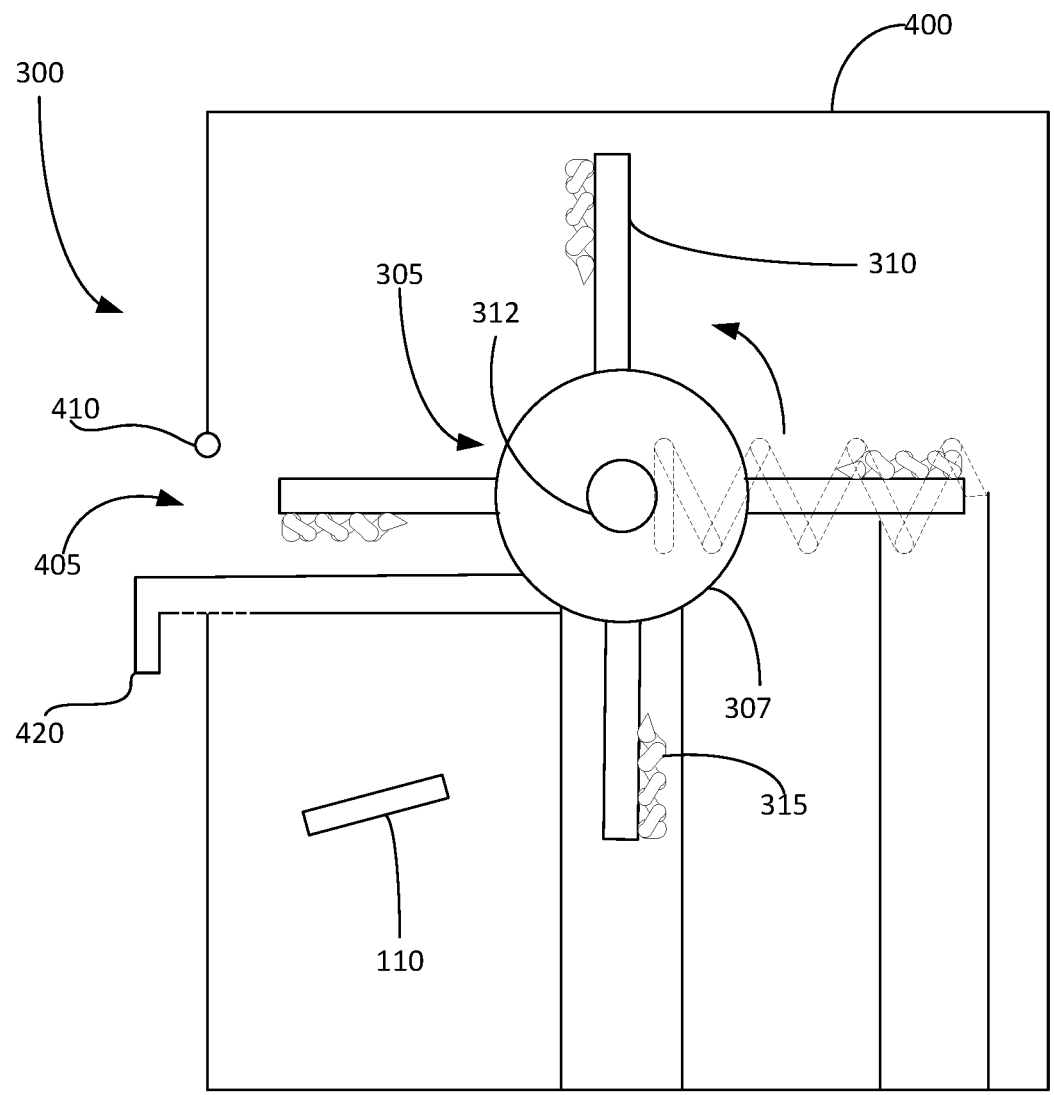
FIG. 5 is a side view of a utensil cover system according to still yet another embodiment of the invention.
Figure 6:
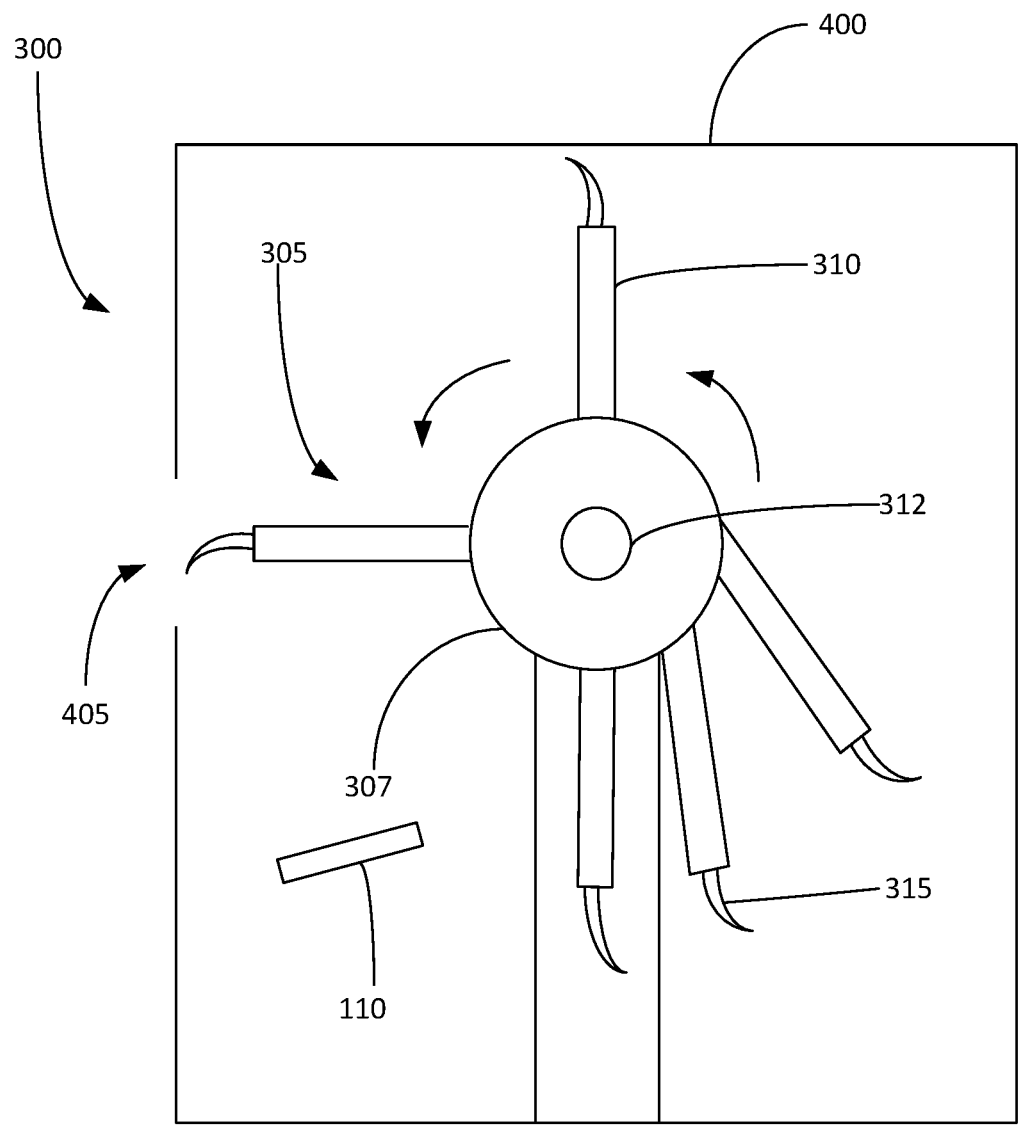
FIG. 6 is a side view of a utensil cover system according to a further embodiment of the invention.

FIGS. 5 and 6 illustrate another embodiment of a utensil cover system 300. Here, the system 300 includes is optionally automated for covering and/or removing a cover from a utensil. According to one embodiment, the system 300 includes a ratchet system 305 having pivotable or fixed arms 310 for removing a used utensil cover 110 from a utensil. The arms 310 are fixed to and extend from a support 307 which rotates about a point of rotation 312. The arms 310 may optionally include fingers, brushes, or other structure 315 configured to grab onto the cover 110 to aid in removal. The structure 315 may be flexible, and in embodiments, it may be preferable for the structure 315 to be made of a nonslip material so as to pull off the cover 110 from the end of the utensil.

In embodiments, the arms 310 are rigidly fixed to the support (FIG. 5), and each arm 310 may be approximately equidistant from the other arms 310. In other embodiments, the arms 310 may be pivotable relative to the support 307 (FIG. 6). Gravity may cause the arms 310 to generally hang from the support 307 in a disengaged position. However, as the support 307 rotates about the point of rotation 312, as illustrated by the arrows in FIG. 6, the arms 310 gain momentum and swing into an engaged position by pivoting relative to the support 307, after which the arms 310 subsequently fall again into the disengaged position.

The support and the arms may be disposed within a housing 400. The housing 400 includes an opening 405 through which a user may place the utensil to remove a used cover 110, 210 therefrom. The support 307 may be positioned within the housing such that the arms 310 engage with a utensil placed through the opening 405 without requiring the user to insert his or her hands into the housing. In embodiments, the support 307 may be selectively adjustable within the housing 400 such that the arms 310 are in an appropriate position to engage with the specific utensil. For example, tongs come in varying lengths. If the tongs have a shorter length, the support 307 may need to be closer to the opening 405 in order for the arms 310 to be positioned in such a way that the arms 310 can appropriately engage with the tongs. If the tongs have a longer length, the support 307 may need to be farther away from the opening 405. In embodiments, a sensor 410 may be located near the opening 405 to gauge the length of the utensil, and the position of the support 307 may be automatically adjusted such that the arms 310 are in a position most appropriate for the size of the utensil.

According to another embodiment, the support 307 is spring loaded. Here, the support 307 (together with the arms 310) may be moved toward a user via an activation member 420 (e.g., a pull handle, foot switch, etc.) from an initial position. The activation member 420 may be configured to stop at various locations in relation to the opening 405 in the housing 400 based on various sizes of utensils. For example, stop slots in the activation member may engage with the housing 400 to allow the support 307 to stop at various locations. When the activation member 420 is disengaged from the housing 400, the spring returns the support 307 to the initial position.

In still another embodiment, the support 307 is selectively extendable via the activation member 407 from an initial position. Here, the support 307 may be attached to the housing 400 (e.g., at a back face of the housing) via an extension arm, such as a scissor extension arm. To use, a user may engage with the activation member 420 to extend the support into the desired position. When the user is finished, the support 307 can be pushed back to the initial position for the next user.

The support 307 may be operably coupled to a motor for rotating the support 307 about the point of rotation 312. The motor may be selectively turned on and off via a switch, for example. In one embodiment, the motor is operably coupled to a sensor, such as a motion sensor, which activates the motor when the sensor determines that a user is accessing the system 300 to remove a used cover 110 from a utensil.

In embodiments, the used cover 110 may be pulled from the utensil via the connection member 120. Where the connection member 120 is absent, structure 315 on the arms 310 may wrap partially around the utensil and pull the cover 110 off the end of the utensil. The cover 110 may then fall into the housing 400, or a receptacle in the housing, for disposal.

Referring now to FIGS. 7A, 7B, and 7C, optionally, the system 300 may additionally, or alternately, include a wrapping module 500 configured to wrap a utensil in a cover. FIGS. 7A-C illustrate an exemplary process for wrapping a utensil 600. Here, the wrapping module 500 may include a first rotating mechanism 510 for holding a roll of film 512, such as a polyethylene plastic, or any other appropriate type of material. A clamping device 514, disposed in a track 516, holds an end of the film away from the roll 510 (FIG. 7A). The user inserts at least a portion of a utensil 600 into the housing to be wrapped. Once the utensil 600 is in the housing, the clamping device 514 travels at least partially around the track 600 from a starting position, wrapping the utensil in the film (FIG. 7B). When the clamping device 514 has travelled about ¾ of the way around the track 516, a blade 518 may extend from the housing 400 and cut the film 512. At the same time, or substantially the same time, the clamping device 514 may open to release the end of the film 512. The clamping device 514 may retract away from the film 512 to avoid interference with the loose ends of the film 512, as necessary. The clamping device 514 catches the cut end of the film 512, and clamps the edge of the film 512 (FIG. 7C). The clamping device 514, together with the edge of the film 512, then returns to the starting position for the next utensil.

The respective loose ends of the film 512 come into contact with the utensil 600, thereby wrapping the utensil 600 in the film 512. The utensil 600 is then removed from the housing 400 and used as desired. The film 512 is then removed from the utensil as described herein. In one example, the housing 400 may include a first portion, including a first opening for inserting the utensil to wrap the utensil via the wrapping module 500, and a second portion, including a second opening for inserting the utensil to remove the wrapping from the utensil for the next user as described herein.

In embodiments, the housing 400 includes a sensor in communication with the wrapping module 500 and configured to sense the presence of a utensil 600 in the housing 400 and to activate the clamping mechanism 514 to move around the track 516 to wrap the utensil in the film 512. In other embodiments, the clamping mechanism 514 is activated via a switch. In still other embodiments, the clamping mechanism 514 may be manually activated by the user.

Optionally, the system may include a setting whereby the film 512 can be shrink-wrapped around the utensil 600 in order to form a seal. The film 512 (shrink-film), comprising a polymer plastic, may shrink tightly around the ends of the utensil 600 when heat is applied. The heat applied may be sufficient to kill any remaining germs on the utensil 600. Once the shrink-film 512 is applied to the utensil 600, it may be permanent, at least until the film 512 can be cut and removed therefrom. In embodiments, the system 300 includes a means for cutting the shrink-film 512 such that it can be removed after use. For example, as the user inserts the utensil 600 into the housing 400, one or more blades may be positioned in such a way it contacts the utensil 600 and cuts the shrink-film 512. The utensil 600 may be further inserted through a constricted area which may remove the shrink-film 512 from the utensil 600. Once the ends of the utensil 600 passes through the constricted area, a new shrink-film 512 may be applied to the utensil 600 for use.

In still further embodiments, the user may manually rotate the utensil 600 within the housing 400 to cover the utensil in the film. 512 For example, the utensil 600 may be inserted into the housing 400 such that the end of the utensil 600 is inside the housing 400. The user may then push the utensil 600 in a downward motion to engage with the film 512. Optionally, when the utensil 600 reaches a predetermined position (e.g., 3 inches below the insert position) the a "melt" setting may be activated to seal the film 512 around the end of the utensil 600. The user may then remove the utensil 600 for use. The film 512 may then be reset (preferably automatically) such that it is ready to receive another utensil 600.

As will be understood by those of skill in the art, the system may be designed for a specific utensil, size of utensil, or set of utensils. The blades, film, and other components may be provided in an insert, which may be removably disposed within the frame such that a single frame can service multiples types and sizes of utensils. Optionally, multiple inserts may be received, and multiple utensils may be covered by the frame at a time.

The system 300 may be semi or fully automated. Where the system is semi-automated, certain portions of the system may be automated, where other portions of the system may be manual. For example, the portion of the system that covers the utensils may be automated (e.g., as described herein, or using other methods contemplated within the scope of the invention), while the removal of the utensil covers from the utensil is done manually.

According to still another embodiment, the housing may include a sanitizing light for sanitizing the utensil prior to, or after, the utensil is wrapped, and/or after a wrapping is removed from the utensil. The sanitizing light may be UV-A, UV-B, UV-C, or another sanitization light whether now known or developed in the future. The sanitizing light may be automatically activated upon the utensil being inserted into the housing. Alternately, the sanitizing light may be manually activated via a switch.

Optionally, the system may be further equipped with outputs to alert the user that the machine is working and/or in use. For example, when the machine is in use, a red light might shine. When the machine is working but not in use, a green light might shine. If the machine is experiencing an issue, an orange light might shine. Optionally, the system may include a means for alerting staff that the machine is experiencing an issue such that it may be swiftly addressed. In embodiments, the system may be equipped with one or more displays for displaying relevant information to the user. For example, advertisers may provide information on the display to convince the user to purchase its products. Prices, ingredients, and other information may optionally be displayed. In an embodiment, the \ system may include means for providing coupons to customers at the direction of a particular advertiser, for example.

It shall be understood by those of ordinary skill in the art that the covers and/or systems described herein may be utilized to cover any utensil in any environment. For example, utensils in medical environments may be covered as described herein to maintain the sanitary nature of the utensils. In another example, it may not be necessary for the utensils to remain sanitary, but it may be preferable for the utensil to remain clean. Accordingly, the utensil may be covered as described herein. The covers may be replaced as necessary in order to maintain the cleanliness of the utensil for the user.

The figures provided herewith are meant to be illustrative only in order to provide a better understanding of the invention. Many different arrangements of the described invention are possible without departing from the spirit and scope of the present invention. Embodiments of the present invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention.

Further, it will be understood that certain features and subcombinations are of utility and may be employed without reference to other features and subcombinations and are contemplated within the scope of the claims. Not all steps listed in the various figures and description need to be carried out in the specific order described. The description should not be restricted to the specific described embodiments.

The invention claimed is:

1. A method of covering a utensil, comprising:
   providing a first utensil;
   providing a utensil cover system, comprising:
   a frame; and
   a first utensil cover, the first utensil cover comprising:
   a first receptacle for receiving an end portion of the first utensil, the end portion being less than a full length of the first utensil; and
   a second utensil cover positioned behind the first utensil cover, the second utensil cover comprising:
   a second receptacle for receiving an end portion of a second utensil, the end portion being less than a full length of the second utensil; and
   wherein at least one of the first and second utensil covers is temporarily attached to the frame; and wherein the first utensil cover is releasably attached to the second utensil cover;

inserting the end portion of the first utensil into the first receptacle of the first utensil cover;

pulling the first utensil away from the frame with the first utensil cover covering the end portion of the first utensil; and using the first utensil with the first utensil cover covering the end portion of the first utensil;

wherein the pulling of the utensil away from the frame:
opens the second utensil cover for receiving the second utensil; and
releases the first utensil cover from the second utensil cover; and wherein the first utensil cover does not cover more than the end portion of the first utensil.

2. The method of claim 1, wherein:
the first utensil cover comprises a first tab extending from the first receptacle;
the second utensil cover comprises a second tab extending from the second receptacle;
the first tab is separated from the first receptacle by a first line of weakness; and
the second tab is separated from the second receptacle by a second line of weakness.

3. The method of claim 2, further comprising:
providing the utensil cover system with a substantially S-shaped propping mechanism having a first end and a second end;
attaching the first end to the frame;
engaging the second end with the first receptacle to hold open the first receptacle to receive the end portion of the first utensil; and
pulling the first utensil cover away from the frame to cause the propping mechanism to engage with the second receptacle to hold open the second receptacle to receive the end portion of the second utensil.

4. The method of claim 1, further comprising horizontally orienting the frame and the respective utensil covers such that the respective utensil covers are held open by gravity.

5. The method of claim 4, further comprising releasably attaching the first utensil cover to the second utensil cover at contact point, the contact point forming a bond between the first utensil cover and the second utensil cover.

6. The method of claim 5, further comprising releasably attaching the second utensil cover to the frame at second contact point, the second contact point forming a bond between the second utensil cover and the frame.

7. The method of claim 1, further comprising configuring the first utensil cover to include a first pair of colinear utensil covers and the second utensil cover to include a second pair of colinear utensil covers.

8. The method of claim 7, further comprising joining first pair of colinear utensil covers at a first connection member, and joining the second pair of colinear utensil covers at a second connection member, wherein each of the first pair of colinear utensil covers and the second pair of utensil covers are selectively separable.

9. The method of claim 1, further comprising attaching the respective utensil covers to the lowermost surface of the frame.

10. A method of covering a utensil, comprising:
providing a first utensil;
providing a utensil cover system, comprising:
a frame;
a first utensil cover, the first utensil cover comprising:
a first receptacle for receiving an end portion of the first utensil, the end portion being less than a full length of the first utensil; and
a second utensil cover positioned behind the first utensil cover, the second utensil cover comprising:
a second receptacle for receiving an end portion of a second utensil, the end portion being less than a full length of the second utensil;
a substantially S-shaped propping member comprising:
a first curved end attached to the frame;
a central portion extending away from the frame; and
a second curved end configured to engage with the first utensil cover;
wherein:
at least one of the first and second utensil covers is temporarily attached to the frame;
the propping member engages with an interior surface of the first receptacle to hold open the first receptacle to receive the end portion of the first utensil; and
an external surface of the first utensil cover is in direct contact with an external surface of the second utensil cover;
inserting the end portion of the first utensil into the first receptacle of the first utensil cover;
pulling the first utensil away from the frame with the first utensil cover covering the end portion of the first utensil;
pulling the first utensil away from the frame to opens the second utensil cover for receiving the second utensil;
engaging the propping member with an interior surface of the second receptacle to hold open the second receptacle to receive the end portion of the second utensil; and
releasing the first utensil cover from the second utensil cover;
wherein, the first utensil cover does not cover more than the end portion of the first utensil.

11. The method of claim 10, further comprising fastening the first utensil cover and the second utensil cover to the frame via a mechanical fastener, the fastener selected from the group consisting of: pins, nails, screws, hooks, and rivets.

* * * * *